United States Patent
Uota

(10) Patent No.: US 8,077,261 B2
(45) Date of Patent: Dec. 13, 2011

(54) DIGITAL GAMMA CORRECTION CIRCUIT AND DIGITAL GAMMA CORRECTION METHOD

(75) Inventor: Toshihiro Uota, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 1306 days.

(21) Appl. No.: 11/723,123

(22) Filed: Mar. 16, 2007

(65) Prior Publication Data

US 2007/0229712 A1 Oct. 4, 2007

(30) Foreign Application Priority Data

Mar. 31, 2006 (JP) ................ P2006-096471

(51) Int. Cl.
*H04N 5/202* (2006.01)
*G03F 3/08* (2006.01)

(52) U.S. Cl. .............. 348/674; 348/254; 358/519

(58) Field of Classification Search ............ 348/254, 348/674, 676, 806; 358/518, 519, 461; 345/589, 345/643, 63, 77, 89
See application file for complete search history.

(56) References Cited

U.S. PATENT DOCUMENTS

| 5,243,426 A * | 9/1993 | Murayama et al. | 348/674 |
| 5,408,267 A * | 4/1995 | Main | 348/254 |
| 6,573,934 B1 * | 6/2003 | Lee | 348/254 |
| 2005/0276502 A1 * | 12/2005 | Brown et al. | 382/254 |
| 2007/0091021 A1 * | 4/2007 | Uota | 345/63 |

FOREIGN PATENT DOCUMENTS

| JP | 8-51557 A | 2/1996 |
| JP | 11-32237 A | 2/1999 |
| JP | 11-120344 A | 4/1999 |

* cited by examiner

*Primary Examiner* — Victor Kostak
(74) *Attorney, Agent, or Firm* — Birch, Stewart, Kolasch & Birch, LLP

(57) ABSTRACT

A correction characteristic storage portion stores coordinates (Xp,Yp) of a break point P and curve approximation range widths Wa and Wb. A basic broken line coefficient calculation portion calculates a coefficient C1 for a straight line OP and a coefficient C2 for a straight line PP'. An auxiliary straight line coefficient calculation portion obtains division points P and Q at which to divide two line segments AP and PB in the proportion in which a curve approximation range is divided by input data X, and calculates a coefficient C0 for an auxiliary straight line PQ. A range determination portion determines whether the input data lies within the curve approximation range. A coefficient selection portion and a primary expression calculation portion perform either correction based on the basic broken line or correction based on the auxiliary straight line according to the determination.

10 Claims, 6 Drawing Sheets

DIGITAL GAMMA CORRECTION CIRCUIT AND DIGITAL GAMMA CORRECTION METHOD

BACKGROUND OF THE INVENTION

1. Field of the Invention

The present invention relates to gamma correction, and more specifically to a digital gamma correction circuit and a digital gamma correction method, which are used in display devices such as liquid crystal displays (LCDs) and plasma display panels (PDPs).

2. Description of the Background Art

In recent years, it has often been the case that display devices (e.g., liquid crystal display devices) for displaying high-definition and high-quality images are used in electronic equipment such as cell phones and digital cameras. For such display devices, a digital gamma correction circuit for performing gamma correction on inputted digital image data is indispensable for displaying more natural images. Also, for electronic equipment, such as scanners and printers, which performs digital image processing, the digital gamma correction circuit is indispensable for outputting more natural images.

For the digital gamma correction circuit, there are conventionally known approaches for performing gamma correction by using a lookup table (hereinafter, referred to as the "LUT") or region splitting and arithmetic processing.

Digital gamma correction circuits used in the LUT approach are provided with an LUT, composed of a ROM or such like, having stored therein values of output data (correction data) in association with values of input data. For example, digital gamma correction circuits for use in a liquid crystal display device are provided with an LUT having stored therein correction data for compensating for a gamma characteristic of a liquid crystal panel, in association with values of input data. The digital gamma correction circuits used in the LUT approach read correction data corresponding to values of input data from the LUT to perform gamma correction on the input data.

On the other hand, in the case of digital gamma correction circuits used in the region-splitting approach, the range of values that can be taken by input data is split into a plurality of regions, for each of which a linearly-represented gamma correction characteristic is defined. The digital gamma correction circuits used in the region-splitting approach perform gamma correction on input data by arithmetic processing in accordance with a gamma correction characteristic of a region including the value of the input data.

Regarding the digital gamma correction circuits used in the LUT approach, Japanese Laid-Open Patent Publication No. 8-51557 discloses that when reading correction data from an LUT composed of a ROM, a result of adding an offset value to a video signal is provided as an address. In addition, regarding the digital gamma correction circuits used in the region-splitting approach, Japanese Laid-Open Patent Publication No. 11-32237 discloses that a gamma characteristic curve is split into a plurality of regions, and the split gamma characteristic curve is approximated by straight lines connected at the borders of the regions, so that gamma correction is performed based on the approximation straight lines. Furthermore, regarding the digital gamma correction circuits used in the region-splitting approach, Japanese Laid-Open Patent Publication No. 11-120344 discloses that positions of break points of a gamma correction broken line are fixed in the direction of input data, so that slope data can be designated for each of a plurality of regions split at the fixed positions, and positions of the break points in the direction of output data can be calculated before performing gamma correction.

In the digital gamma correction circuits used in the LUT approach, however, the LUT is required to store correction data corresponding to all values of input data. Therefore, in the digital gamma correction circuits used in the LUT approach, the number of pieces of correction data that have to be stored tends to become significant as the number of bits in input data is increased.

Also, in order for the digital gamma correction circuits used in the region-splitting approach to become applicable to devices with various gamma characteristics, it is necessary to, for example, provide coordinates of the break points, and locate the borders of the regions in suitable positions in accordance with the gamma characteristics of the devices. In addition, in order to obtain substantially ideal smooth gamma correction characteristics, it is necessary to increase the number of regions. Therefore, in the digital gamma correction circuits used in the region-splitting approach, the number of pieces of data that are to be preset tends to be increased in order to obtain smooth gamma correction characteristics.

SUMMARY OF THE INVENTION

Therefore, an object of the present invention is to provide a digital gamma correction circuit and a digital gamma correction method that are capable of obtaining a smooth correction characteristic by merely presetting a small number of pieces of data.

The present invention has the following features to attain the object mentioned above.

An aspect of the present invention is directed to a digital gamma correction circuit configured such that a correction characteristic can be set, the circuit comprising: a correction characteristic storage portion for storing, as data for defining the correction characteristic, data for specifying a basic broken line and data for specifying a curve approximation range extending below and above a break point on the basic broken line; a range determination portion for determining whether input data lies within the curve approximation range based on the data stored in the correction characteristic storage portion; an auxiliary straight line coefficient calculation portion for calculating a coefficient for an auxiliary straight line for defining the correction characteristic based on the input data as well as the data stored in the correction characteristic storage portion; and a correction execution portion for correcting the input data based on the basic broken line when the range determination portion determines that the input data lies outside the range, while correcting the input data based on the auxiliary straight line when the range determination portion determines that the input data lies within the range, the auxiliary straight line coefficient calculation portion obtaining two division points at which two line segments of the basic broken line that are contained in the curve approximation range containing the input data are divided in proportion in which the curve approximation range is divided by the input data, and calculating a coefficient for an auxiliary straight line extending between the two division points.

In the digital gamma correction circuit, the data for specifying the basic broken line and the data for specifying the curve approximation range are stored as the data for defining the correction characteristic, and when the input data lies within the curve approximation range, gamma correction is performed based on an auxiliary straight line having a coefficient continually changing to accord with changes of the input data. Thus, by presetting the data for specifying the basic broken line and the data for specifying the curve approximation range, it becomes possible to obtain a smooth gamma correction characteristic curving within the curve approximation range.

In this case, the correction characteristic storage portion may store coordinates of the break point as the data for specifying the basic broken line, and the digital gamma correction circuit may further comprise a basic broken line coefficient calculation portion for calculating a coefficient for the basic broken line based on the coordinates of the break point that are stored in the correction characteristic storage portion. Thus, it becomes possible to specify the basic broken line with a small number of pieces of data, and obtain a smooth gamma correction characteristic curving within the curve approximation range.

Alternatively, the correction characteristic storage portion may store, as the data for specifying the basic broken line, coordinates of the break point and a coefficient for the basic broken line. Thus, it becomes possible to simplify calculation for the case of the input data lying outside the curve approximation range, thereby reducing the scale of circuitry.

Alternatively, the correction characteristic storage portion may store, as the data for specifying the curve approximation range, widths of upper and lower portions of the curve approximation range, the upper and lower portions being positioned respectively above and below the break point. Thus, it becomes possible to obtain a gamma correction characteristic that changes in a curved manner within the curve approximation range.

More preferably, the digital gamma correction circuit may further comprise a range calculation portion for calculating the widths of the upper and lower portions such that a portion of the basic broken line that is contained in the lower portion and a portion of the basic broken line that is contained in the upper portion are equal in length to each other, and the correction characteristic storage portion may store the two widths calculated by the range calculation portion. Thus, by merely setting a piece of data (e.g., widths in the direction of the basic broken line) as the data for specifying the curve approximation range, it becomes possible to obtain a gamma correction characteristic that changes in a curved manner within the curve approximation range and is symmetric about the break point.

Also, the correction execution portion may include: a coefficient selection portion for selecting a coefficient for the basic broken line when the range determination portion determines that the input data lies outside the range, while selecting the coefficient for the auxiliary straight line when the range determination portion determines that the input data lies within the range; and a primary expression calculation portion for calculating a value by assigning the input data to a primary expression having the coefficient selected by the coefficient selection portion. Thus, the correction execution portion can be configured to select the coefficient and calculate the value of a primary expression using the selected coefficient, making it possible to switch between correction based on the basic broken line and correction based on the auxiliary straight line.

Alternatively, the correction execution portion may include: a first primary expression calculation portion for calculating a value by assigning the input data to a primary expression having a coefficient for the basic broken line; a second primary expression calculation portion for calculating a value by assigning the input data to a primary expression having the coefficient for the auxiliary straight line; and a calculation result selection portion for selecting the value calculated by the first primary expression calculation portion when the range determination portion determines that the input data lies outside the range, while selecting the value calculated by the second primary expression calculation portion when the range determination portion determines that the input data lies within the range. Thus, the correction execution portion can be configured to calculate the values of the primary expressions in two different ways, and select either of the values, making it possible to switch between correction based on the basic broken line and correction based on the auxiliary straight line.

Alternatively, the auxiliary straight line coefficient calculation portion may be activated only when the range determination portion determines that the input data lies within the range. In this manner, by suppressing unnecessary arithmetic processing, it becomes possible to reduce circuit power consumption.

Another aspect of the present invention is directed to a digital gamma correction method configured such that a correction characteristic can be set, the method comprising: a correction characteristic storage step for storing, as data for defining the correction characteristic, data for specifying a basic broken line and data for specifying a curve approximation range extending below and above a break point on the basic broken line; a range determination step for determining whether input data lies within the curve approximation range based on the data stored by the correction characteristic storage step; an auxiliary straight line coefficient calculation step for calculating a coefficient for an auxiliary straight line for defining the correction characteristic based on the input data as well as the data stored by the correction characteristic storage step; and a correction execution step for correcting the input data based on the basic broken line when the input data is determined by the range determination step to lie outside the range, while correcting the input data based on the auxiliary straight line when the input data is determined by the range determination step to lie within the range, the auxiliary straight line coefficient calculation step being performed to obtain two division points at which two line segments of the basic broken line that are contained in the curve approximation range containing the input data are divided in proportion in which the curve approximation range is divided by the input data, and calculate a coefficient for an auxiliary straight line extending between the two division points.

Still another aspect of the present invention is directed to a method for determining a gamma correction characteristic based on a basic broken line and a curve approximation range extending below and above a break point on the basic broken line, the method comprising: a range selection step for selecting the curve approximation range that contains input data; a proportion calculation step for calculating proportion in which the curve approximation range selected by the range selection step is divided by the input data; a division point calculation step for calculating two division points at which two line segments of the basic broken line that are contained in the curve approximation range selected by the range selection step are divided in the proportion calculated by the proportion calculation step; and a coefficient calculation step for calculating a coefficient for an auxiliary straight line extending between the two division points in order to determine gamma correction calculation that is to be applied to the input data. Thus, it becomes possible to obtain a smooth gamma correction characteristic that curves within the curve approximation range based on the basic broken line and the curve approximation range.

These and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Figure 1:
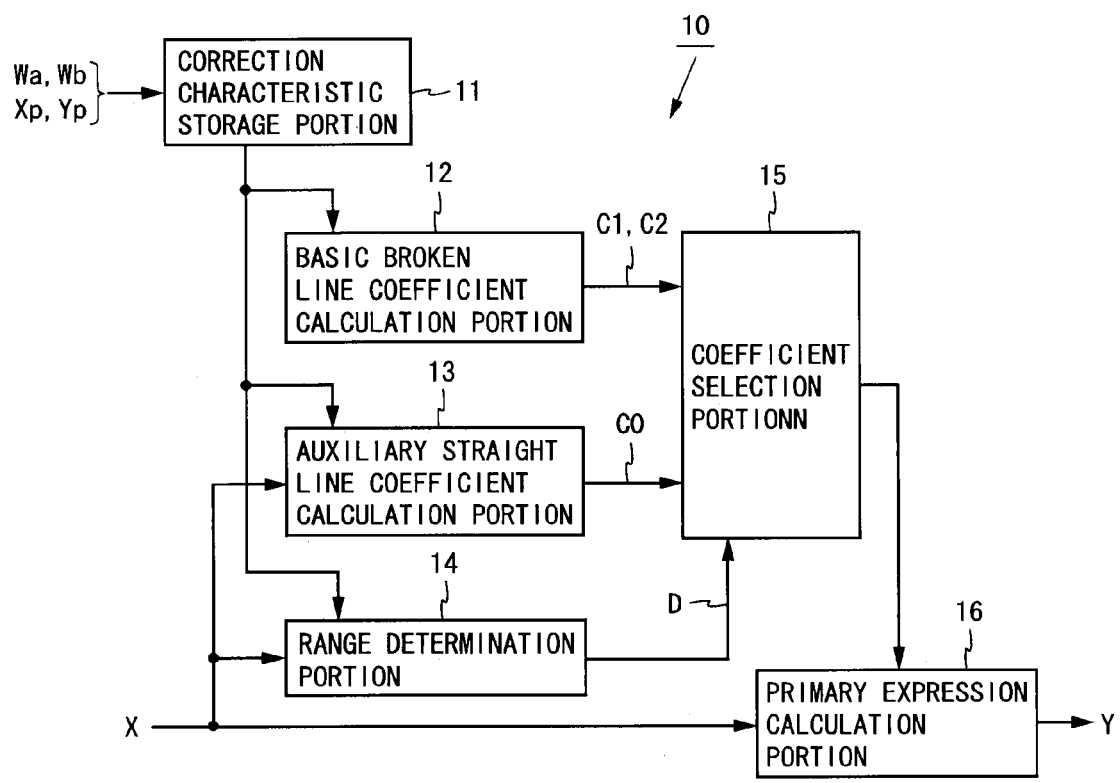
FIG. 1 is a block diagram illustrating a configuration of a digital gamma correction circuit according to a first embodiment of the present invention.

FIG. 1 is a block diagram illustrating a configuration of a digital gamma correction circuit according to a first embodiment of the present invention. The digital gamma correction circuit 10 shown in FIG. 1 includes a correction characteristic storage portion 11, a basic broken line coefficient calculation portion 12, an auxiliary straight line coefficient calculation portion 13, a range determination portion 14, a coefficient selection portion 15, and a primary expression calculation portion 16. The digital gamma correction circuit 10 performs predetermined gamma correction on input data X, and outputs a correction result as output data Y. The gamma correction characteristic of the digital gamma correction circuit 10 is determined by externally provided data (hereinafter, referred to as the "correction characteristic parameter").

The correction characteristic parameter provided to the digital gamma correction circuit 10 contains data for specifying a broken line for defining the basic structure of the gamma correction characteristic (hereinafter, referred to as the "basic broken line"), and data for specifying ranges, each extending below and above a break point on the basic broken line (hereinafter, referred to as the "curve approximation ranges"). When the input data X lies outside the curve approximation ranges, the digital gamma correction circuit 10 performs gamma correction based on the basic broken line, whereas when the input data X lies within any one of the curve approximation ranges, the digital gamma correction circuit 10 obtains an auxiliary straight line (the detail of which will be described later) for defining a gamma correction characteristic based on the input data X and the correction characteristic parameter, and performs gamma correction based on the obtained auxiliary straight line.

The correction characteristic storage portion 11 stores the correction characteristic parameter provided from outside the digital gamma correction circuit 10. In the digital gamma correction circuit 10, a basic broken line with a break point (see FIG. 2) is used for defining the basic structure of a gamma correction characteristic. The correction characteristic parameter contains coordinates (Xp,Yp) of the break point P as data for specifying the basic broken line, and widths Wa and Wb below and above, respectively, the break point P in the curve approximation range, which together constitute data for specifying the curve approximation range. The correction characteristic parameter stored in the correction characteristic storage portion 11 is provided as necessary to each component of the digital gamma correction circuit 10. Specifically, the coordinates (Xp,Yp) of the break point P are provided to the basic broken line coefficient calculation portion 12, the auxiliary straight line coefficient calculation portion 13 and the range determination portion 14, whereas the curve approximation range widths Wa and Wb are provided to the auxiliary straight line coefficient calculation portion 13 and the range determination portion 14.

The basic broken line coefficient calculation portion 12 calculates coefficients C1 and C2 for the basic broken line including the break point P based on the coordinates (Xp,Yp) of the break point P. The coefficient C1 for the basic broken line indicates a slope and an intercept of one of two straight lines for defining the basic broken line, and the coefficient C2 for the basic broken line indicates a slope and an intercept of the other straight line. The auxiliary straight line coefficient calculation portion 13 calculates a coefficient C0 for the auxiliary straight line based on the input data X, the curve approximation range widths Wa and Wb, and the coordinates (Xp,Yp) of the break point P. The coefficient C0 for the auxiliary straight line indicates a slope and an intercept of the auxiliary straight line.

The range determination portion 14 determines whether the input data X lies within the curve approximation range based on the input data X, the curve approximation range widths Wa and Wb, and the coordinates (Xp,Yp) of the break point P, and outputs a determination result D. Note that the range determination portion 14 does not refer to the Y-coordinate Yp of the break point P.

When the range determination portion 14 determines that the input data X lies outside the range, the coefficient selection portion 15 selects the coefficient C1 or C2 for the basic broken line, whereas when the range determination portion 14 determines that the input data X lies within the range, the coefficient selection portion 15 selects the coefficient C0 for the auxiliary straight line. The primary expression calculation portion 16 calculates a value by assigning the input data X to a primary expression having the coefficient selected by the coefficient selection portion 15. The value calculated by the primary expression calculation portion 16 is outputted as the output data Y to the outside of the digital gamma correction circuit 10. In this manner, the coefficient selection portion 15 and the primary expression calculation portion 16 function together as a correction execution portion for correcting the input data X based on the basic broken line when the input data X is determined as lying outside the range by the range determination portion 14 or based on the auxiliary straight line when determined as lying within the range by the range determination portion 14.

Figure 2:
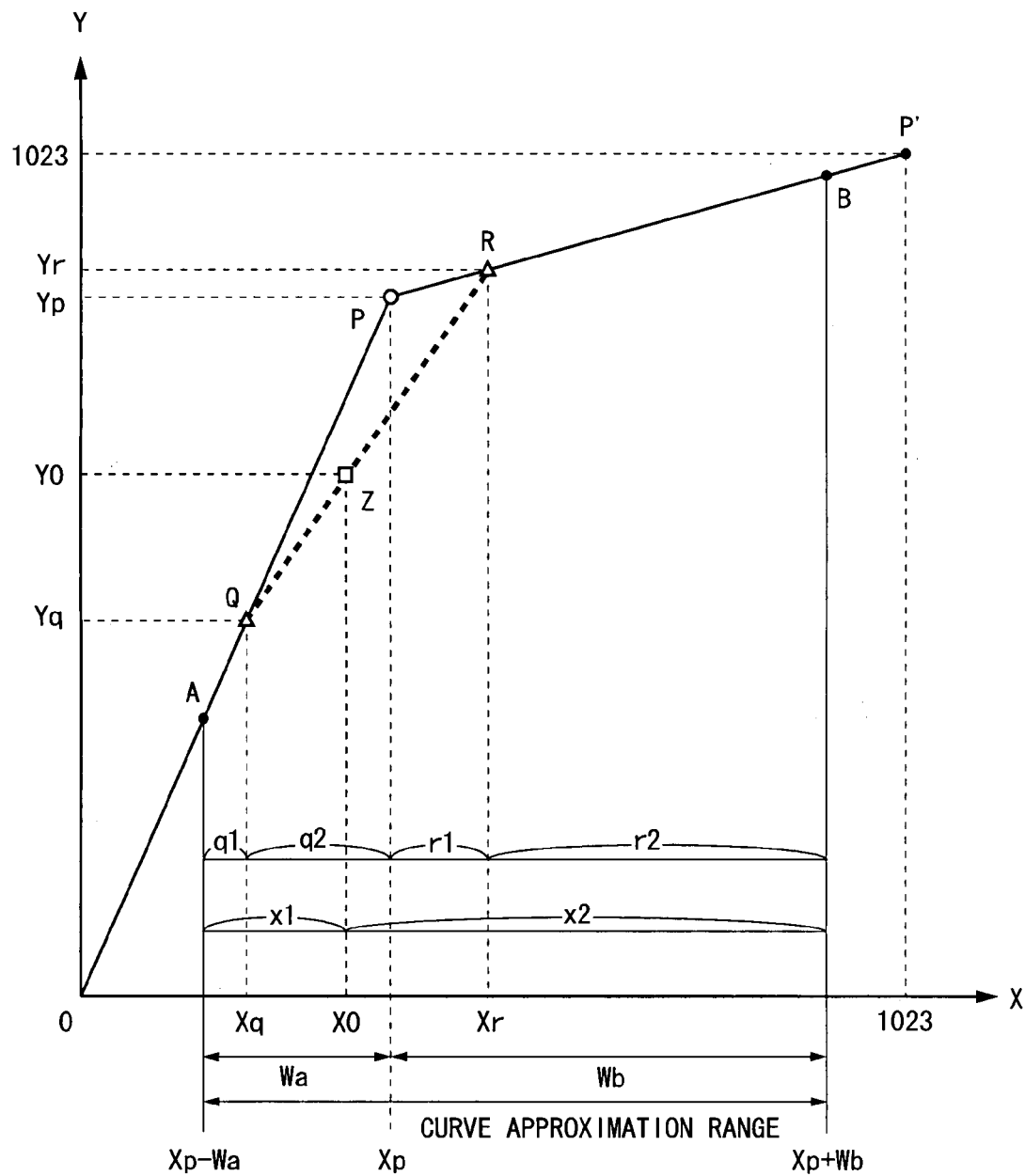
FIG. 2 is a graph illustrating a basic broken line and a curve approximation range that are used in the digital gamma correction circuit shown in FIG. 1.

FIG. 2 is a graph illustrating the basic broken line and the curve approximation range that are used in the digital gamma correction circuit 10. In FIG. 2, the horizontal axis (X-axis) indicates the input data X, and the vertical axis (Y-axis) indicates the output data Y. The basic broken line shown in FIG.

2 includes one break point P(Xp,Yp). Also, the curve approximation range is defined so as to extend below and above the break point P, and divided into two widths Wa and Wb in the X-axis direction. As such, in the digital gamma correction circuit 10, the curve approximation range extends from (Xp−Wa) to (Xp+Wb). In the following description, the input data X and the output data Y may take a value from 0 to 1023.

When the input data X lies within the curve approximation range, the digital gamma correction circuit 10 performs gamma correction based on an auxiliary straight line extending between two division points provided on the basic broken line. These two division points are points at which two line segments contained within the curve approximation range of the basic broken line are divided in the same proportion as the curve approximation range is divided by the input data X.

For example, as shown in FIG. 2, when the input data X has a value X0 from (Xp−Wa) to (Xp+Wb), inclusive, the curve approximation range is divided by the input data X in the proportion {X0−(Xp−Wa)}:{(Xp+Wb)−X0}. When points at the intersections of the basic broken line with the curve approximation range are A and B, the curve approximation range contains two line segments AP and PB of the basic broken line. The point at which to divide the line segment AP in the above-mentioned proportion is a division point Q, whereas the point at which to divide the line segment PB in the above-mentioned proportion is a division point R. When performing gamma correction on the input data X having a value X0, a straight line extending between the division points P and Q is used as an auxiliary straight line for determining the gamma correction characteristic. Note that in FIG. 2, the relationship x1:x2=q1:q2=r1:r2 is established.

Hereinbelow, the operation of the digital gamma correction circuit 10 will be described in more detail with reference to FIG. 2. The correction characteristic storage portion 11 stores the coordinates (Xp,Yp) of the break point P as the data for specifying the basic broken line, and the curve approximation range widths Wa and Wb as the data for specifying the curve approximation range.

The range determination portion 14 determines whether the input data X lies within the curve approximation range based on the input data X as well as the curve approximation range widths Wa and Wb and the coordinates (Xp,Yp) of the break point P that are stored in the correction characteristic storage portion 11. When the input data X lies within the curve approximation range (i.e., Xp−Wa≦X≦Xp+Wb), the range determination portion 14 provides the determination result D as 0. In addition, when the input data X is below the curve approximation range (i.e., X<Xp−Wa), the range determination portion 14 provides the determination result D as 1, whereas it provides the determination result D as 2 when the input data X lies above the curve approximation range (i.e., X>Xp+Wb).

The basic broken line coefficient calculation portion 12 calculates a coefficient C1 (a slope and an intercept) for a straight line extending between the origin O and the break point P, and a coefficient C2 (a slope and an intercept) for a straight line extending between the break point P and a point P' (1023,1023). These two straight lines are obtained by equations (1) and (2), respectively. The coefficients C1 and C2 for the basic broken line can be readily obtained from the two equations.

$$Y = Yp/Xp \times X \quad (1)$$

$$Y = (1023-Yp)/(1023-Xp) \times (X-Xp) + Yp \quad (2)$$

Figure 3:
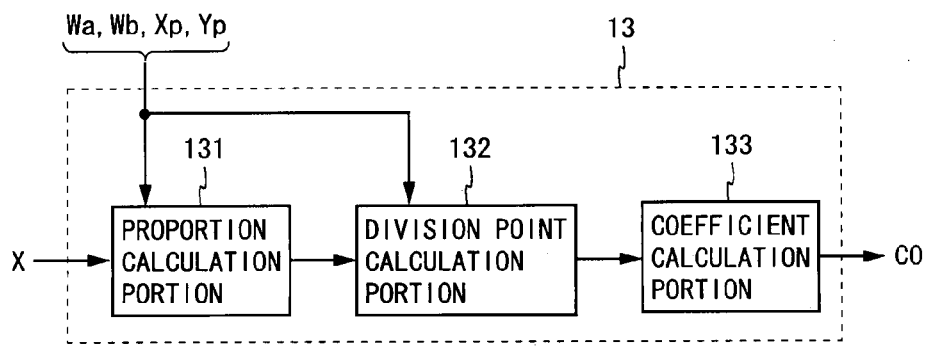
FIG. 3 is a block diagram illustrating a detailed configuration of an auxiliary straight line coefficient calculation portion included in the digital gamma correction circuit shown in FIG. 1.

The auxiliary straight line coefficient calculation portion 13 includes a proportion calculation portion 131, a division point calculation portion 132, and a coefficient calculation portion 133, as shown in FIG. 3. The proportion calculation portion 131 calculates the proportion (x1:x2) in which the curve approximation range is divided by the input data X, based on the input data X (having a value X0) as well as the curve approximation range widths Wa and Wb and the coordinates (Xp,Yp) of the break point P that are stored in the correction characteristic storage portion 11. This proportion is given by equation (3).

$$x1:x2 = \{X0-(Xp-Wa)\}:\{(Xp+Wb)-X0\} \quad (3)$$

The division point calculation portion 132 calculates coordinates (Xq,Yq) of the division point Q at which the line segment AP is divided in the proportion (x1:x2) and coordinates (Xr,Yr) of the division point R at which the line segment PB is divided in the proportion (x1:x2), based on the curve approximation range widths Wa and Wb and the coordinates (Xp,Yp) of the break point P that are stored in the correction characteristic storage portion 11 as well as the proportion calculated by the proportion calculation portion 131. More specifically, equation (4) is obtained, considering that the proportion in which the line segment AP is divided at the division point Q is equal to the proportion in which the curve approximation range width Wa is divided at the X-coordinate Xq of the division point Q, whereas the proportion in which the line segment PB is divided by the division point R is equal to the proportion in which the curve approximation range width Wb is divided at the X-coordinate Xr of the division point R. By solving the equation (4), the X-coordinate Xq of the division point Q and the X-coordinate Xr of the division point R are given by equations (5) and (6), respectively. In addition, the Y-coordinate Yq of the division point Q is given by equation (7) based on the equations (1) and (5), and the Y-coordinate Yr of the division point R is given by equation (8) based on the equations (2) and (6).

$$\frac{\{X0-(Xp-Wa)\}:}{\{(Xp+Wb)-X0\}} = \{Xq-(Xp-Wa)\}:(Xp-Xq) \quad (4)$$

$$= (Xr-Xp):\{(Xp+Wb)-Xr\}$$

$$Xq = \{Wa \times X0 + Wb \times (Xp-Wa)\}/(Wa+Wb) \quad (5)$$

$$Xr = \{Wb \times X0 + Wa \times (Xp+Wb)\}/(Wa+Wb) \quad (6)$$

$$Yq = Yp/Xp \times Xq \quad (7)$$

$$Yr = (1023-Yp)/(1023-Xp) \times (Xr-Xp) + Yp \quad (8)$$

The coefficient calculation portion 133 calculates a coefficient C0 (a slope and an intercept) for the auxiliary straight line extending between the division points Q and R, based on the coordinates (Xq,Yq) of the division point Q and the coordinates (Xr,Yr) of the division point R that are calculated by the division point calculation portion 132. The auxiliary straight line extending between the division points Q and R is given by equation (9). In the equation (9), Xq, Xr, Yq and Yr are given by the equations (5) to (8), and therefore the coefficient C0 for the auxiliary straight line can be readily obtained from the equation (9).

$$Y = (Yr-Yq)/(Xr-Xq) \times (X-Xq) + Yq \quad (9)$$

The coefficient selection portion 15 selects the coefficient C0 for the auxiliary straight line, which is obtained from the equation (9), when the determination result D is 0; the coefficient C1 for the basic broken line, which is obtained from the equation (1), when the determination result D is 1; or the coefficient C2 for the basic broken line, which is obtained from the equation (2), when the determination result D is 2. The primary expression calculation portion 16 calculates a value by assigning the input data X to the primary expression having the coefficient selected by the coefficient selection portion 15, and outputs the obtained value as the output data Y. When the determination result D is 0, the output data Y is the Y-coordinate Y0 of a point Z shown in FIG. 2.

In this manner, the digital gamma correction circuit 10 performs gamma correction based on the basic broken line as shown in the equations (1) and (2) when the input data X lies outside the curve approximation range, whereas it performs gamma correction based on the auxiliary straight line as shown in the equation (9) when the input data X lies within the curve approximation range.

When the input data X continually changes within the curve approximation range, the division points Q and R move along the line segments AP and PB, respectively, and the coefficient C0 for the auxiliary straight line continually changes. Accordingly, the gamma correction characteristic of the digital gamma correction circuit 10 is curved between the two points A and B within the curve approximation range. In order for the conventional digital gamma correction circuits used in the region-splitting approach to obtain a smooth gamma correction characteristic, it is necessary to increase the number of regions, and preset a number of pieces of data. The digital gamma correction circuit 10, on the other hand, makes it possible to obtain a smooth gamma correction characteristic curving in the curve approximation range by merely presetting the coordinates (Xp,Yp) of the break point P and the curve approximation range widths Wa and Wb.

As described above, the digital gamma correction circuit 10 according to the present embodiment stores, as the data for defining a correction characteristic, the data for specifying the basic broken line and the data for specifying the curve approximation range, and when the input data lies within the curve approximation range, the digital gamma correction circuit 10 performs gamma correction based on the auxiliary straight line having a coefficient that continually changes so as to accord with changes of input data. Accordingly, by merely presetting the data for specifying the basic broken line and the data for specifying the curve approximation range, it becomes possible to obtain a smooth gamma correction characteristic that changes so as to curve within the curve approximation range.

In particular, the digital gamma correction circuit 10 includes the basic broken line coefficient calculation portion 12 for calculating the coefficient C0 for the basic broken line based on the coordinates (Xp,Yp) of the break point P, and therefore it is possible to specify the basic broken line with a small number of pieces of data, and obtain a smooth gamma correction characteristic that changes so as to curve within the curve approximation range.

Second Embodiment

Figure 4:
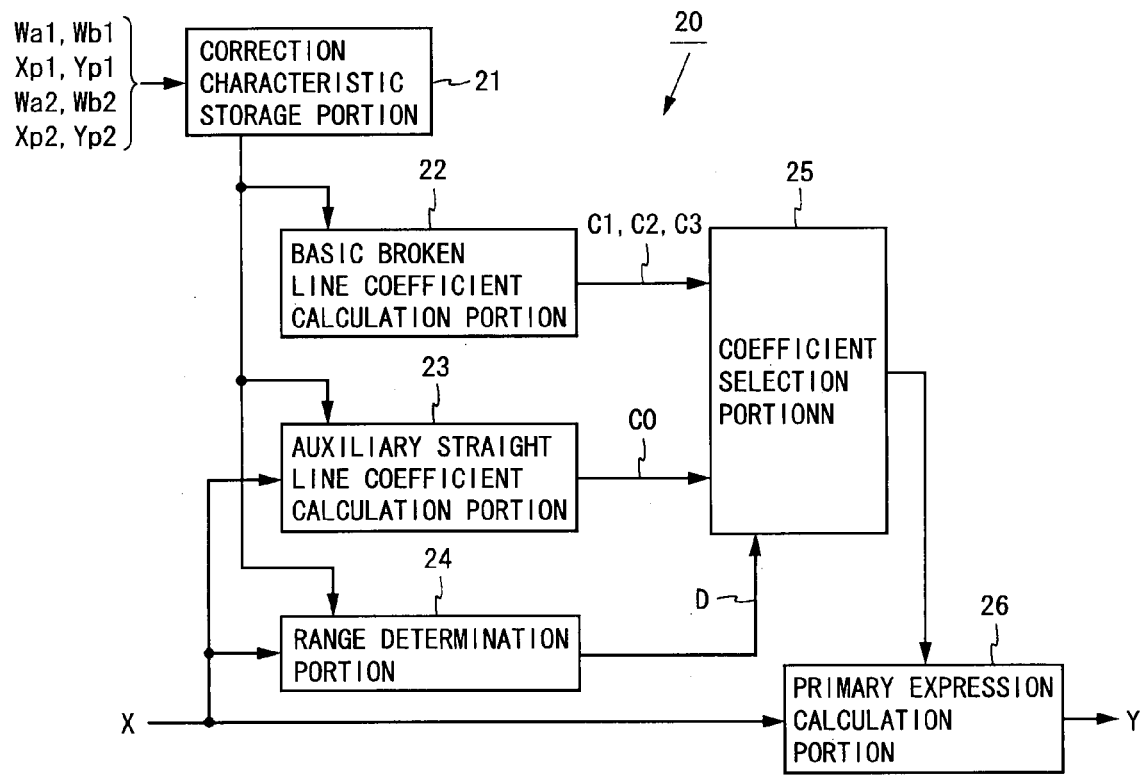
FIG. 4 is a block diagram illustrating a configuration of a digital gamma correction circuit according to a second embodiment of the present invention.

FIG. 4 is a block diagram illustrating a configuration of a digital gamma correction circuit according to a second embodiment of the present invention. The digital gamma correction circuit 20 shown in FIG. 4 includes a correction characteristic storage portion 21, a basic broken line coefficient calculation portion 22, an auxiliary straight line coefficient calculation portion 23, a range determination portion 24, a coefficient selection portion 25, and a primary expression calculation portion 26. The digital gamma correction circuit 20 has the same structure as the digital gamma correction circuit 10 according to the first embodiment (FIG. 1), and performs gamma correction in the same manner as the digital gamma correction circuit 10. Therefore, the following description focuses on differences from the first embodiment, and any description concerning common points with the first embodiment will be omitted herein.

Figure 5:
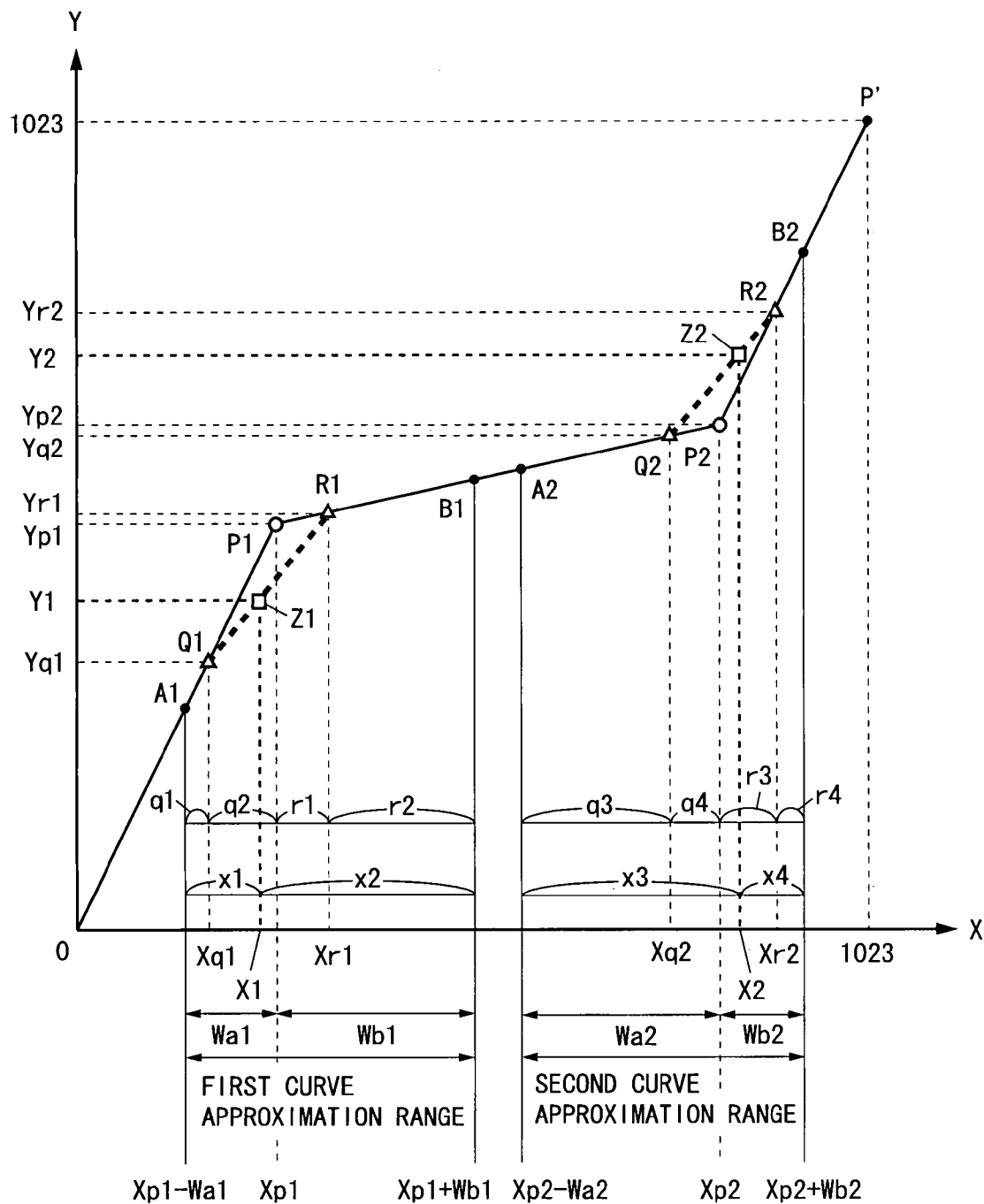
FIG. 5 is a graph illustrating a basic broken line and curve approximation ranges that are used in the digital gamma correction circuit shown in FIG. 4.

FIG. 5 is a graph illustrating a basic broken line and curve approximation ranges that are used in the digital gamma correction circuit 20. The basic broken line shown in FIG. 5 contains two break points P1(Xp1,Yp1) and P2(Xp2,Yp2). In addition, a first curve approximation range extending below and above the break point P1 is divided into two widths Wa1 and Wb1 in the X-axis direction, and a second curve approximation range extending below and above the break point P2 is divided into two widths Wa2 and Wb2 in the X-axis direction. As such, in the digital gamma correction circuit 20, the curve approximation ranges extend from (Xp1−Wa1) to (Xp1+Wb1) and (Xp2−Wa2) to (Xp2+Wb2), respectively.

As in the first embodiment, when the input data X lies within any one of the curve approximation ranges, the digital gamma correction circuit 20 performs gamma correction based on an auxiliary straight line extending between two division points provided on the basic broken line. When the curve approximation range including the input data X is S, these two division points are points at which two line segments of the basic broken line is divided within the curve approximation range S in the same proportion as the curve approximation range S is divided by the input data X.

For example, when the input data X is a value X1 from (Xp1−Wa1) to (Xp1+Wb1), inclusive, as shown in FIG. 5, the proportion in which the first curve approximation range is divided by the input data X is {X1−(Xp1−Wa1)}:{(Xp1+Wb1)−X1}. When points at the intersections of the basic broken line with the first curve approximation range are A1 and B1, the basic broken line contains two line segments A1P1 and P1B1 within the first curve approximation range. The point at which to divide the line segment A1P1 in the above-mentioned proportion is a division point Q1, and the point at which to divide the line segment P1B1 in the above-mentioned proportion is a division point R1. When performing gamma correction on the input data X having a value X1, a straight line extending between the division points P1 and Q1 is used as the auxiliary straight line.

The same can be applied to the case of the input data X having a value X2 from (Xp2−Wa2) to (Xp2+Wb2), inclusive. Specifically, when points at the intersections of the basic broken line with the second curve approximation range are A2 and B2, the point at which to divide the line segment A2P2 in the proportion {X2−(Xp2−Wa2)}:{(Xp2+Wb2)−X2} is a division point Q2, and the point at which to divide the line segment P2B2 in the same proportion is a division point R2. When performing gamma correction on the input data X having a value X2, a straight line extending between the division points P2 and Q2 is used as the auxiliary straight line. Note that in FIG. 5, the relationships x1:x2=q1:q2=r1:r2 and x3:x4=q3:q4=r3:r4 are established.

Hereinbelow, the operation of the digital gamma correction circuit 20 will be described in more detail with reference to FIG. 5. The correction characteristic storage portion 21 stores, as the data for specifying the basic broken line, the coordinates (Xp1,Yp1) of the break point P1 and the coordinates (Xp2,Yp2) of the break point P2, and also stores the curve approximation range widths Wa1, Wb1, Wa2 and Wb2 as the data for specifying the curve approximation ranges.

The range determination portion 24 determines whether the input data X lies within any one of the curve approximation ranges, based on the input data X as well as the four curve approximation range widths and the coordinates of the two break points that are stored in the correction characteristic storage portion 21. The range determination portion 24 provides a determination result D as 0 when the input data X lies within the first or second curve approximation range (i.e., $Xp1-Wa1 \leq X \leq Xp1+Wb1$ or $Xp2-Wa2 \leq X \leq Xp2+Wb2$). In addition, the range determination portion 24 provides the determination result D as 1 when the input data X lies below the first curve approximation range (i.e., $X<Xp1-Wa1$); the determination result D as 2 when the input data X lies between the two curve approximation ranges (i.e. $Xp1+Wb1<X<Xp2-Wa2$); or the determination result D as 3 when the input data X lies above the second curve approximation range (i.e., $X>Xp2+Wb2$).

The basic broken line coefficient calculation portion 22 calculates a coefficient C1 (a slope and an intercept) for a straight line extending between the origin O and the break point P1, a coefficient C2 (a slope and an intercept) for a straight line extending between the break points P1 and P2, and a coefficient C3 (a slope and an intercept) for a straight line extending between the break point P2 and a point P' (1023,1023). These three straight lines are given by equations (11), (12) and (22), respectively. The coefficients C1 to C3 for the basic broken line can be readily obtained from the three equations.

$$Y=Yp1/Xp1 \times X \qquad (11)$$

$$Y=(Yp2-Yp2)/(Xp2-Xp1) \times (X-Xp1)+Yp1 \qquad (12)$$

$$Y=(1023-Yp2)/(1023-Xp2) \times (X-Xp2)+Yp2 \qquad (22)$$

As in the case of the auxiliary straight line coefficient calculation portion 13 according to the first embodiment (FIG. 3), the auxiliary straight line coefficient calculation portion 23 includes a proportion calculation portion, a division point calculation portion, and a coefficient calculation portion. As will be described below, the operations of these three components vary between the input data X within the first curve approximation range and the input data X within the second curve approximation range.

When the input data X lies within the first curve approximation range, the proportion calculation portion calculates the proportion (x1:x2) in which the first curve approximation range is divided by the input data X1, based on the input data X (having a value X1) as well as the curve approximation range widths Wa1 and Wb1 and the coordinates (Xp1,Yp1) of the break point P1 that are stored in the correction characteristic storage portion 21. This proportion is given by equation (13).

$$x1:x2=\{X1-(Xp1-Wa1)\}:\{(Xp1+Wb1)-X1\} \qquad (13)$$

The division point calculation portion calculates the coordinates (Xq1,Yq1) of the division point Q1 at which to divide the line segment A1P1 in the proportion (x1:x2) and the coordinates (Xr1,Yr1) of the division point R1 at which to divide the line segment P1B1 in the proportion (x1:x2), based on the curve approximation range widths Wa1 and Wb1 and the coordinates (Xp1,Yp1) of the break point P1 that are stored in the correction characteristic storage portion 21 as well as the proportion calculated by the proportion calculation portion. More specifically, as in the first embodiment, by solving equation (14) the X-coordinate Xq1 of the division point Q1 and the X-coordinate Xr1 of the division point R1 are given by equations (15) and (16), respectively. In addition, the Y-coordinate Yq1 of the division point Q1 and the Y-coordinate Yr1 of the division point R1 are given by equations (17) and (18), respectively.

$$\frac{\{X1-(Xp1-Wa1)\}:}{\{(Xp1+Wb1)-X1\}} = \{Xq1-(Xp1-Wa1)\}:(Xp1-Xq1) \qquad (14)$$

$$= (Xr1-Xp1):\{(Xp1+Wb1)-Xr1\}$$

$$Xq1=\{Wa1 \times X1+Wb1 \times (Xp1-Wa1)\}/(Wa1+Wb1) \qquad (15)$$

$$Xr1=\{Wb1 \times X1+Wa1 \times (Xp1+Wb1)\}/(Wa1+Wb1) \qquad (16)$$

$$Yq1=Yp1/Xp1 \times Xq1 \qquad (17)$$

$$Yr1=(Yp2-Yp1)/(Xp2-Xp1) \times (Xr1-Xp1)+Yp1 \qquad (18)$$

The coefficient calculation portion calculates a coefficient C0 (a slope and an intercept) for an auxiliary straight line extending between the division points Q1 and R1, based on the coordinates (Xq1,Yq1) of the division point Q1 and the coordinates (Xr1,Yr1) of the division point R1 that are calculated by the division point calculation portion. The auxiliary straight line extending between the division points Q1 and R1 is given by equation (19). In the equation (19), Xq1, Xr1, Yq1 and Yr1 can be obtained from the equations (15) to (18), and therefore the coefficient C0 for the auxiliary straight line can be readily obtained from the equation (19).

$$Y=(Yr1-Yq1)/(Xr1-Xq1) \times (X-Xq1)+Yq1 \qquad (19)$$

When the input data X lies within the second curve approximation range, on the other hand, the proportion calculation portion calculates the proportion (x3:x4) in which the second curve approximation range is divided by the input data X2, based on the input data X (having a value X2) as well as the curve approximation range widths Wa2 and Wb2 and the coordinates (Xp2,Yp2) of the break point P2 that are stored in the correction characteristic storage portion 21. This proportion is given by equation (23).

$$x3:x4=\{X2-(Xp2-Wa2)\}:\{(Xp2+Wb2)-X2\} \qquad (23)$$

The division point calculation portion calculates the coordinates (Xq2,Yq2) of the division point Q2 at which to divide the line segment A2P2 in the proportion (x3:x4) and the coordinates (Xr2,Yr2) of the division point R2 at which to divide the line segment P2B2 in the proportion (x3:x4), based on the curve approximation range widths Wa2 and Wb2 and the coordinates (Xp2,Yp2) of the break point P2 that are stored in the correction characteristic storage portion 21 as well as the proportion calculated by the proportion calculation portion. More specifically, as in the first embodiment, by solving equation (24) the X-coordinate Xq2 of the division point Q2 and the X-coordinate Xr2 of the division point R2 are given by equations (25) and (26), respectively. In addition, the Y-coordinate Yq2 of the division point Q2 and the Y-coordinate Yr2 of the division point R2 are given by equations (27) and (28), respectively.

$$\frac{\{X2-(Xp2-Wa2)\}:}{\{(Xp2+Wb2)-X2\}} = \{Xq2-(Xp2-Wa2)\}:(Xp2-Xq2) \qquad (24)$$

$$= (Xr2-Xp2):\{(Xp2+Wb2)-Xr2\}$$

$$Xq2=\{Wa2 \times X2+Wb2 \times (Xp2-Wa2)\}/(Wa2+Wb2) \qquad (25)$$

$$Xr2=\{Wb2 \times X2+Wa2 \times (Xp2+Wb2)\}/(Wa2+Wb2) \qquad (26)$$

$$Yq2=(Yp2-Yp1)/(Xp2-Xp1) \times (Xq2-Xp1)+Yp1 \qquad (27)$$

$$Yr2=(1023-Yp2)/(1023-Xp2) \times (Xr2-Xp2)+Yp2 \qquad (28)$$

The coefficient calculation portion calculates a coefficient C0 (a slope and an intercept) for an auxiliary straight line extending between the division points Q2 and R2, based on the coordinates, (Xq2,Yq2) of the division point Q2 and the coordinates (Xr2,Yr2) of the division point R2 that are calculated by the division point calculation portion. The auxiliary straight line extending between the division points Q2 and R2 is given by equation (29). In the equation (29), Xq2, Xr2, Yq2 and Yr2 are given by the equations (25) to (28), and therefore the coefficient C0 for the auxiliary straight line can be readily obtained from the equation (29).

$$Y=(Yr2-Yq2)/(Xr2-Xq2) \times (X-Xq2)+Yq2 \quad (29)$$

The coefficient selection portion 25 selects the coefficient C0 for the auxiliary straight line, which is obtained from the equation (19) or (29), when the determination result D is 0; the coefficient C1 for the basic broken line, which is obtained from the equation (11), when the determination result D is 1; the coefficient C2 for the basic broken line, which is obtained from the equation (12), when the determination result D is 2; or the coefficient C3 for the basic broken line, which is obtained from the equation (22), when the determination result D is 3. The primary expression calculation portion 26 calculates a value by assigning the input data X to a primary expression having the coefficient selected by the coefficient selection portion 25, and outputs the obtained value as the output data Y. When the determination result D is 0, the output data Y is the Y-coordinate Y1 of a point Z1 or the Y-coordinate Y2 of a point Z2 as shown in FIG. 5.

In this manner, when the input data X lies outside the curve approximation range, the digital gamma correction circuit 20 performs gamma correction based on the basic broken line obtained from the equations (11), (12) and (22) whereas when the input data X lies within the curve approximation range, the digital gamma correction circuit 20 performs gamma correction based on the auxiliary straight line obtained from the equation (19) or (29).

As in the first embodiment, when the input data X continually changes within the first curve approximation range, the division points Q1 and R1 move along the line segments A1P1 and P1B1, respectively, and the coefficient C0 for the auxiliary straight line continually changes. The same can be applied to the case of the input data X continually changing within the second curve approximation range. The digital gamma correction circuit 20 makes it possible to obtain a smooth gamma correction characteristic curving in the first and second curve approximation ranges by merely presetting the coordinates (Xp1,Yp1) of the break point P1, the coordinates (Xp2,Yp2) of the break point P2, and the curve approximation range widths Wa1, Wb1, Wa2 and Wb2.

As described above, the digital gamma correction circuit 20 according to the present embodiment makes it possible to obtain a smooth gamma correction characteristic curving in the curve approximation ranges by merely presetting the data for specifying the basic broken line and the data for specifying the curve approximation ranges as in case of the digital gamma correction circuit 10 according to the first embodiment.

While the foregoing description has been given with respect to the case where the basic broken line has two break points, it is possible to, even when the number of break points on the basic broken line is 3 or more, configure a digital gamma correction circuit having the same structure as the digital gamma correction circuit 20 and performing gamma correction in the same manner as the digital gamma correction circuit 20. In this case, the number of break points is determined based on a gamma characteristic of a device (e.g., a liquid crystal display device) in which the digital gamma correction circuit is provided. When the device has a gamma characteristic with frequent curves, the number of break points on the basic broken line may be increased.

Figure 6:
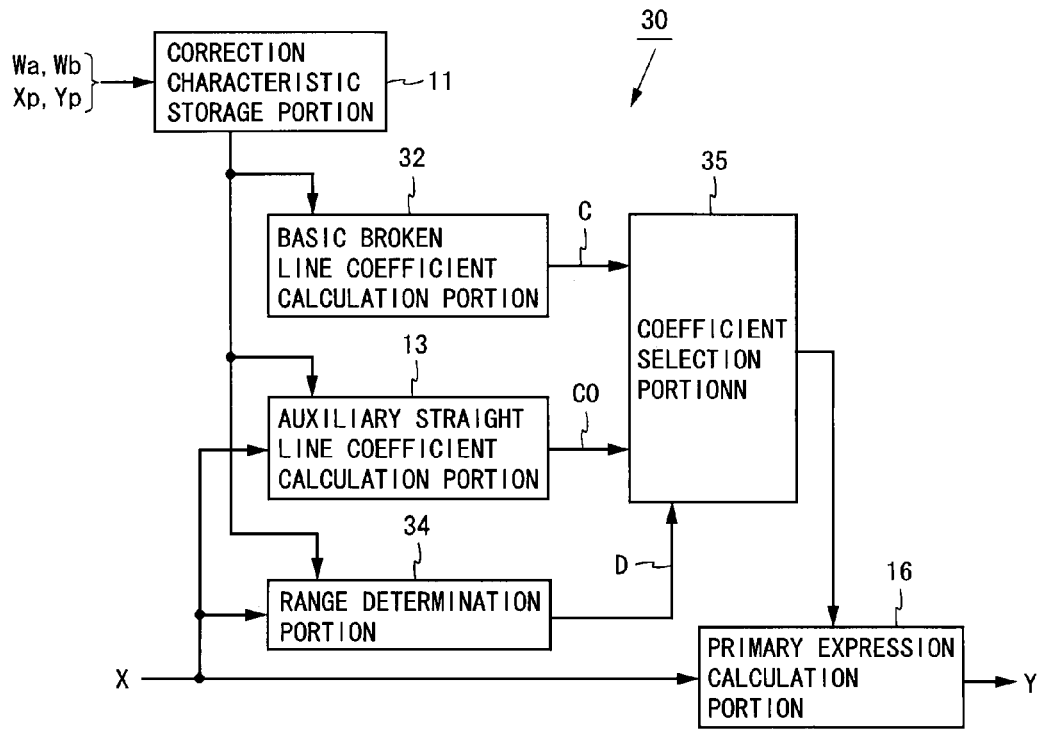
FIG. 6 is a block diagram illustrating a configuration of a digital gamma correction circuit according to a first variant of the first embodiment of the present invention.

As for the digital gamma correction circuit 10 according to the first embodiment, various variations can be made as described below. In a digital gamma correction circuit 30 according to a first variant (see FIG. 6), a basic broken line coefficient calculation portion 32 determines whether the input data X lies below the curve approximation range, and outputs either of the coefficients C1 and C2 for the basic broken line as a coefficient C in accordance with the determination result. A range determination portion 34 provides the determination result D as 0 when the input data X lies within the curve approximation range, or the determination result D as 1 when the input data X lies outside the curve approximation range. A coefficient selection portion 35 selects the coefficient C for the basic broken line when the determination result D is 1, or the coefficient C0 for the auxiliary straight line when the determination result D is 0. In this manner, the basic broken line coefficient calculation portion 32 may select the coefficient for the basic broken line.

Figure 7:
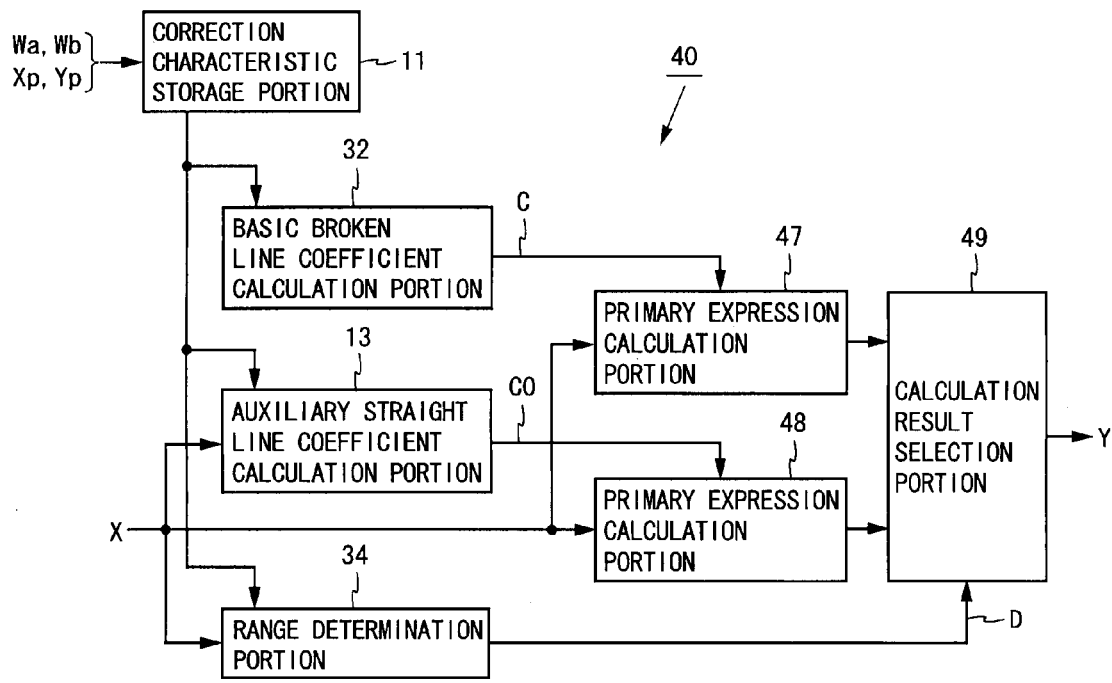
FIG. 7 is a block diagram illustrating a configuration of a digital gamma correction circuit according to a second variant of the first embodiment of the present invention.

In a digital gamma correction circuit 40 according to a second variant (see FIG. 7), a primary expression calculation portion 47 calculates a value by assigning the input data X to a primary expression having the coefficient C calculated by the basic broken line coefficient calculation portion 32. A primary expression calculation portion 48 calculates a value by assigning the input data X to a primary expression having the coefficient C0 calculated by the auxiliary straight line coefficient calculation portion 13. A calculation result selection portion 49 selects the value calculated by the primary expression calculation portion 47 when the input data X is determined as lying outside the range by the range determination portion 34 or the value calculated by the primary expression calculation portion 48 when the input data X is determined as lying within the range by the range determination portion 34. In this manner, the correction execution portion may calculate the values of the primary expressions in two different ways, and select either of the values, making it possible to switch between correction based on the basic broken line and correction based on the auxiliary straight line.

Figure 8:
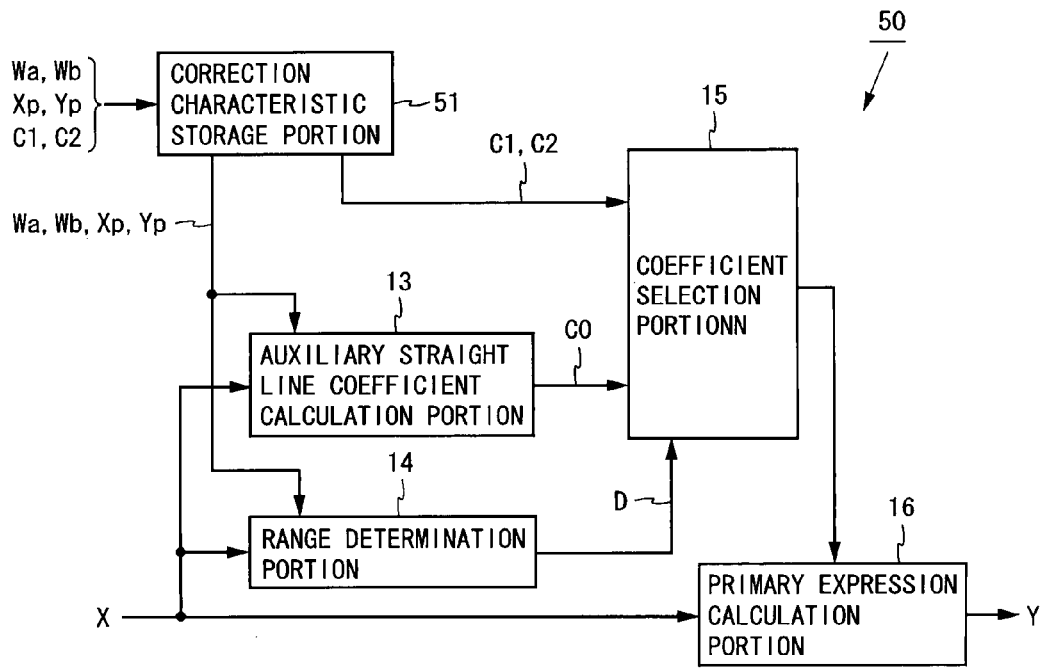
FIG. 8 is a block diagram illustrating a configuration of a digital gamma correction circuit according to a third variant of the first embodiment of the present invention.

A digital gamma correction circuit 50 according to a third variant (see FIG. 8) does not include the basic broken line coefficient calculation portion. However, a correction characteristic storage portion 51, instead, stores, as the data for specifying the basic broken line, the coordinates (Xp,Yp) of the break point P and the coefficients C1 and C2 for the basic broken line, which are provided from outside the digital gamma correction circuit 50. The coefficients C1 and C2 for the basic broken line that are stored in the correction characteristic storage portion 51 are provided to the coefficient selection portion 15. In this manner, by storing the coefficients C1 and C2 for the basic broken line as the data for specifying the basic broken line, it becomes possible to simplify calculation for the case of the input data X lying outside the curve approximation range, thereby reducing the scale of circuitry.

Figure 9:
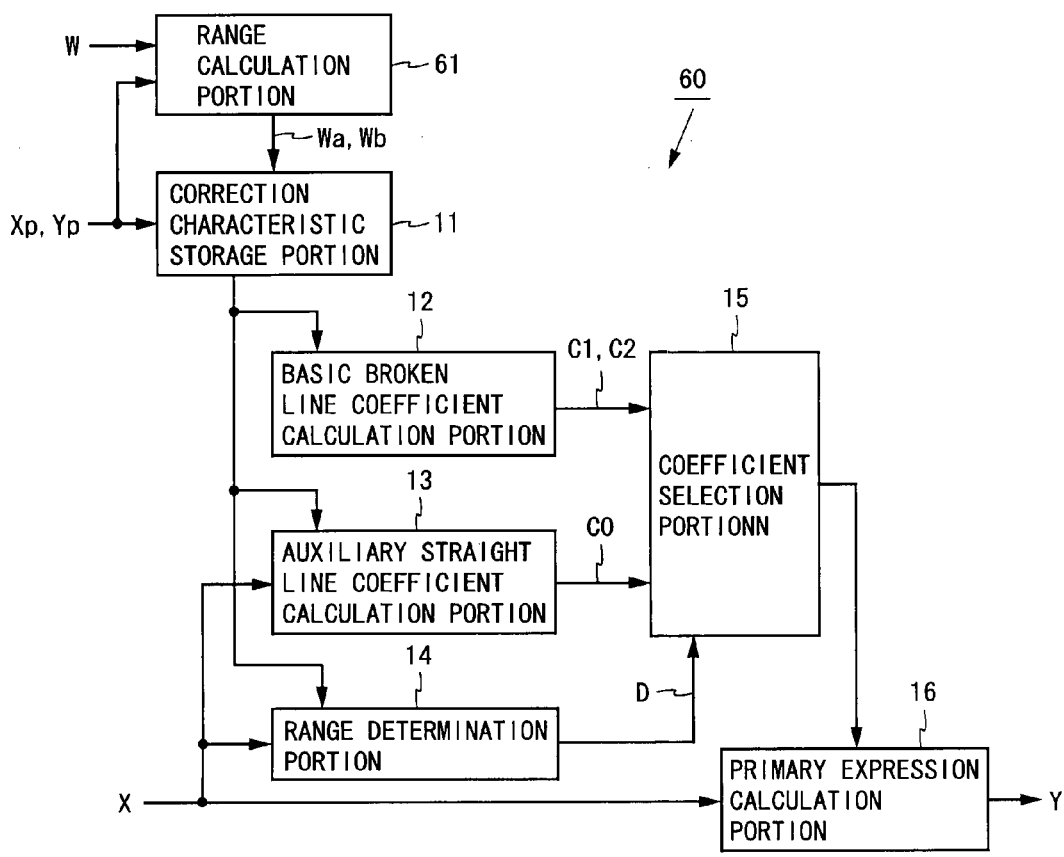
FIG. 9 is a block diagram illustrating a configuration of a digital gamma correction circuit according to a fourth variant of the first embodiment of the present invention.

A digital gamma correction circuit 60 according to a fourth variant (see FIG. 9) further includes a range calculation portion 61. The range calculation portion 61 is provided with a width W of the curve approximation range in the direction of the basic broken line from outside the digital gamma correction circuit 60. In the example shown in FIG. 2, the curve approximation range width W defines the lengths of the line segment AP and PB.

The range calculation portion 61 calculates partial widths Wa and Wb of the curve approximation range in the X-axis direction such that a portion of the basic broken line that is contained in the lower portion of the curve approximation range is equal in length to a portion of the basic broken line that is contained in the upper portion. Specifically, based on the provided widths W, the range calculation portion 61 calculates the partial widths Wa and Wb of the curve approximation range in the X-axis direction in accordance with equations (31) and (32). Note that m and M in the following two equations are slopes of two straight lines for defining the basic broken line.

$$Wa = W/(1+m^2)^{1/2} \tag{31}$$

$$Wb = W/(1+M^2)^{1/2} \tag{32}$$

The correction characteristic storage portion 11 stores the partial widths Wa and Wb of the curve approximation range in the X-axis direction that are calculated by the range calculation portion 61. Thus, by merely setting the widths in the basic broken line direction as the data for specifying the curve approximation range, it becomes possible to obtain a gamma correction characteristic that changes in a curved manner within the curve approximation range and is symmetric about the break point.

In a digital gamma correction circuit according to a fifth variant (not shown), the auxiliary straight line coefficient calculation portion is activated only when the input data is determined as lying within the range by the range determination portion. Alternatively, the basic broken line coefficient calculation portion may be activated only when the input data is determined as lying outside the range by the range determination portion. In this manner, by suppressing unnecessary arithmetic processing, it becomes possible to reduce circuit power consumption.

In addition, regarding the digital gamma correction circuit 20 according to the second embodiment, a sixth variant can be implemented as described below, along with the first through fifth variants. In the digital gamma correction circuit (not shown) according to the sixth variant, the correction characteristic storage portion stores the same value for partial widths of curve approximation ranges, each extending below and above a break point. For example, in the example shown in FIG. 5, the correction characteristic storage portion 21 stores the same value for the curve approximation range widths Wa1 and Wa2, and the same value for the curve approximation range widths Wb1 and Wb2. Thus, it is possible to specify the curve approximation ranges with a smaller number of pieces of data, and simplify the process of setting a correction characteristic. The sixth variant is effective when gamma correction characteristics within the curve approximation ranges are approximately equal to each other.

In addition, data other than those described earlier can be used for specifying the basic broken line and the curve approximation ranges. For example, a difference in coordinates from an immediately preceding break point (a relative position to an immediately preceding break point) may be used as the data for specifying the basic broken line, and X-coordinates at the boundaries of the curve approximation range (e.g., (Xp−Wa) and (Xp+Wb) in FIG. 2) may be used as the data for specifying the curve approximation range.

While the invention has been described in detail, the foregoing description is in all aspects illustrative and not restrictive. It is understood that numerous other modifications and variations can be devised without departing from the scope of the invention.

Note that the present application claims priority to Japanese Patent Application No. 2006-96471, titled "DIGITAL GAMMA CORRECTION CIRCUIT AND DIGITAL GAMMA CORRECTION METHOD", filed on Mar. 31, 2006, which is incorporated herein by reference.

What is claimed is:

1. A digital gamma correction circuit configured such that a correction characteristic can be set, the circuit comprising:
    a correction characteristic storage portion for storing, as data for defining the correction characteristic, data for specifying a basic broken line and data for specifying a curve approximation range extending below and above a break point on the basic broken line;
    a range determination portion for determining whether input data lies within the curve approximation range based on the data stored in the correction characteristic storage portion;
    an auxiliary straight line coefficient calculation portion for calculating a coefficient for an auxiliary straight line for defining the correction characteristic based on the input data as well as the data stored in the correction characteristic storage portion; and
    a correction execution portion for correcting the input data based on the basic broken line when the range determination portion determines that the input data lies outside the range, while correcting the input data based on the auxiliary straight line when the range determination portion determines that the input data lies within the range,
    wherein the auxiliary straight line coefficient calculation portion obtains two division points at which two line segments of the basic broken line that are contained in the curve approximation range containing the input data are divided in proportion in which the curve approximation range is divided by the input data, and calculates a coefficient for an auxiliary straight line extending between the two division points.

2. The digital gamma correction circuit according to claim 1,
    wherein the correction characteristic storage portion stores coordinates of the break point as the data for specifying the basic broken line, and
    wherein the circuit further comprises a basic broken line coefficient calculation portion for calculating a coefficient for the basic broken line based on the coordinates of the break point that are stored in the correction characteristic storage portion.

3. The digital gamma correction circuit according to claim 1, wherein the correction characteristic storage portion stores, as the data for specifying the basic broken line, coordinates of the break point and a coefficient for the basic broken line.

4. The digital gamma correction circuit according to claim 1, wherein the correction characteristic storage portion stores, as the data for specifying the curve approximation range, widths of upper and lower portions of the curve approximation range, the upper and lower portions being positioned respectively above and below the break point.

5. The digital gamma correction circuit according to claim 4, further comprising a range calculation portion for calculating the widths of the upper and lower portions such that a portion of the basic broken line that is contained in the lower portion and a portion of the basic broken line that is contained in the upper portion are equal in length to each other,
    wherein the correction characteristic storage portion stores the two widths calculated by the range calculation portion.

6. The digital gamma correction circuit according to claim 1,
wherein the correction execution portion includes:
a coefficient selection portion for selecting a coefficient for the basic broken line when the range determination portion determines that the input data lies outside the range, while selecting the coefficient for the auxiliary straight line when the range determination portion determines that the input data lies within the range; and
a primary expression calculation portion for calculating a value by assigning the input data to a primary expression having the coefficient selected by the coefficient selection portion.

7. The digital gamma correction circuit according to claim 1,
wherein the correction execution portion includes:
a first primary expression calculation portion for calculating a value by assigning the input data to a primary expression having a coefficient for the basic broken line;
a second primary expression calculation portion for calculating a value by assigning the input data to a primary expression having the coefficient for the auxiliary straight line; and
a calculation result selection portion for selecting the value calculated by the first primary expression calculation portion when the range determination portion determines that the input data lies outside the range, while selecting the value calculated by the second primary expression calculation portion when the range determination portion determines that the input data lies within the range.

8. The digital gamma correction circuit according to claim 1, wherein the auxiliary straight line coefficient calculation portion is activated only when the range determination portion determines that the input data lies within the range.

9. A digital gamma correction method configured such that a correction characteristic can be set, the method comprising:
a correction characteristic storage step for storing, as data for defining the correction characteristic, data for specifying a basic broken line and data for specifying a curve approximation range extending below and above a break point on the basic broken line;
a range determination step for determining whether input data lies within the curve approximation range based on the data stored by the correction characteristic storage step;
an auxiliary straight line coefficient calculation step for calculating a coefficient for an auxiliary straight line for defining the correction characteristic based on the input data as well as the data stored by the correction characteristic storage step; and
a correction execution step for correcting the input data based on the basic broken line when the input data is determined by the range determination step to lie outside the range, while correcting the input data based on the auxiliary straight line when the input data is determined by the range determination step to lie within the range,
wherein the auxiliary straight line coefficient calculation step is performed to obtain two division points at which two line segments of the basic broken line that are contained in the curve approximation range containing the input data are divided in proportion in which the curve approximation range is divided by the input data, and calculate a coefficient for an auxiliary straight line extending between the two division points.

10. A method for determining a gamma correction characteristic based on a basic broken line and a curve approximation range extending below and above a break point on the basic broken line, the method comprising:
a range selection step for selecting the curve approximation range that contains input data;
a proportion calculation step for calculating proportion in which the curve approximation range selected by the range selection step is divided by the input data;
a division point calculation step for calculating two division points at which two line segments of the basic broken line that are contained in the curve approximation range selected by the range selection step are divided in the proportion calculated by the proportion calculation step; and
a coefficient calculation step for calculating a coefficient for an auxiliary straight line extending between the two division points in order to determine gamma correction calculation that is to be applied to the input data.

* * * * *